June 24, 1930.  V. F. HITT ET AL  1,768,466
RUMBLE SEAT
Filed March 6, 1929   2 Sheets-Sheet 1

V.F.Hitt and J.O.Evans, INVENTOR

BY Victor J. Evans ATTORNEY

June 24, 1930.  V. F. HITT ET AL  1,768,466
RUMBLE SEAT
Filed March 6, 1929   2 Sheets-Sheet 2
Fig. 2.
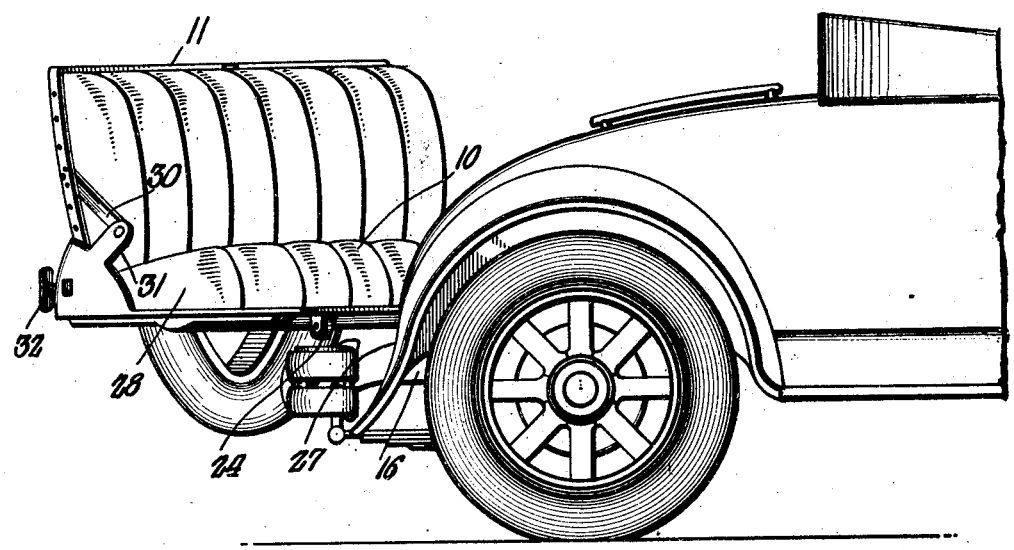
Fig. 5.
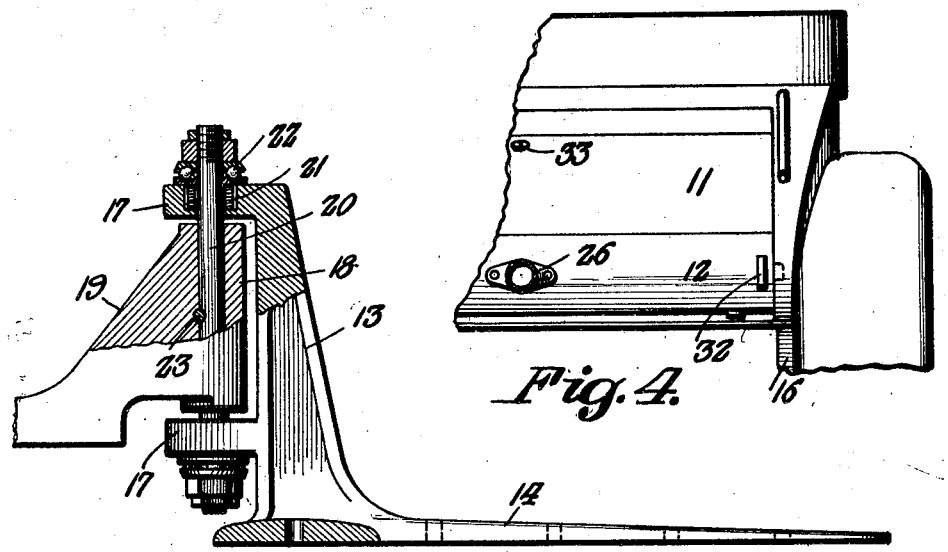
Fig. 4.
V. F. Hitt and J. O. Evans,
INVENTOR
BY Victor J. Evans
ATTORNEY Patented June 24, 1930

1,768,466

UNITED STATES PATENT OFFICE

VERLINGTON FARROW HITT AND JOSEPH ORD EVANS, OF MIAMI BEACH, FLORIDA

RUMBLE SEAT

Application filed March 6, 1929. Serial No. 344,786.

This invention relates to improvements in automobiles of the roadster and coupé types of bodies, an object being to provide an auxiliary or rumble seat for bodies of the type mentioned which may be moved into position, whereby the occupants may enter and leave the automobile without climbing over the fender, and thus eliminate danger of injury to the finish, as well as provide a more convenient manner of entering and leaving.

Another object of the invention is the provision of means for mounting the seat so that it may be swung horizontally and pivotally outward, leaving no obstruction for the entrance to or exit from the seat, so that danger due to stumbling or tripping will be reduced to a minimum.

With the above and other objects in view, the invention further includes the following novel features and details of construction, to be hereinafter more fully described, illustrated in the accompanying drawings and pointed out in the appended claims.

In the drawings:—

Figure 2 is a side view of the same.

Figure 4 is a fragmentary rear elevation.

Figure 5 is a fragmentary elevation partly in section showing the hinge connection between the seat and bracket.

Figure 1:
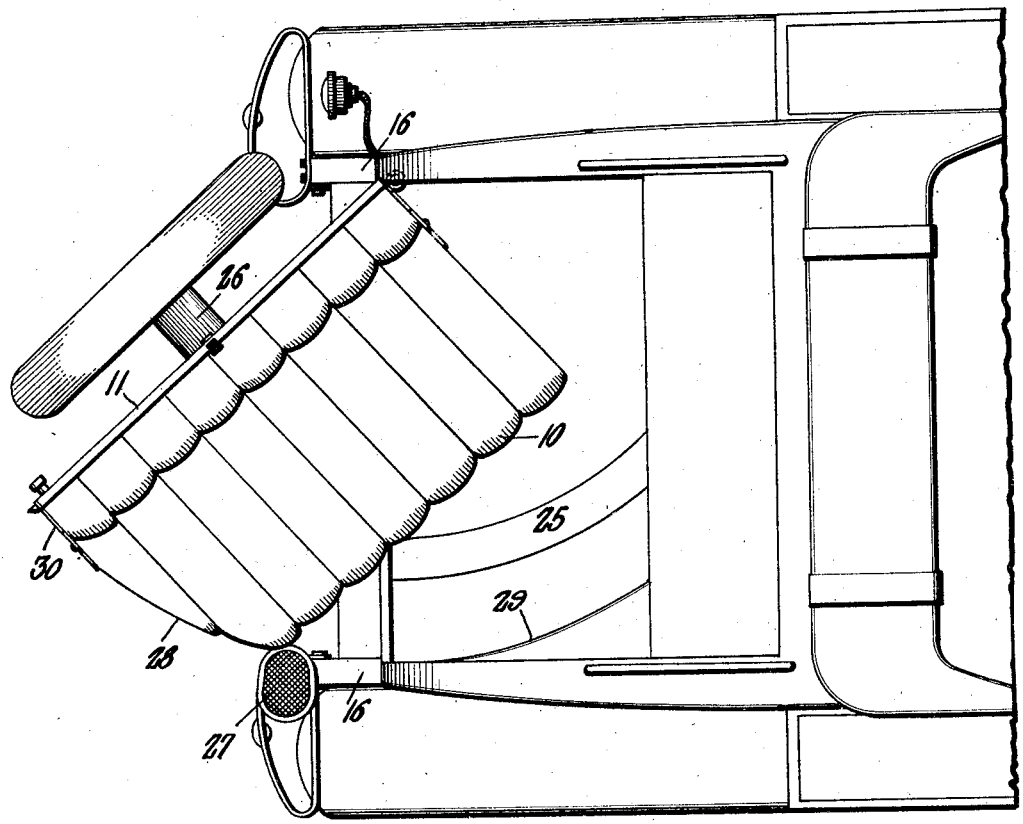
Figure 1 is a fragmentary plan view showing the rear portion of an automobile body with the invention applied, the seat being swung to open position.
Figure 3:
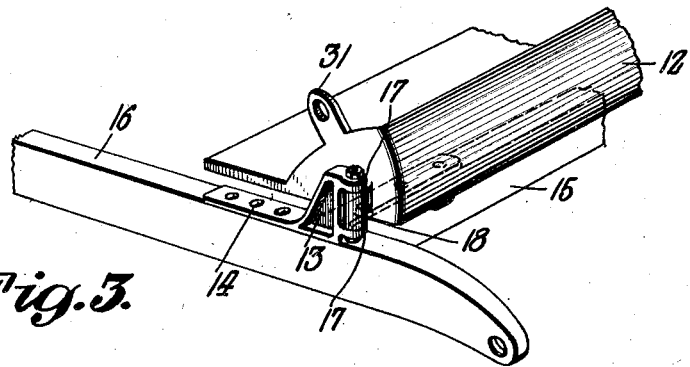
Figure 3 is a fragmentary perspective view showing one corner of the frame of the automobile and illustrating the manner of mounting the seat.

Referring to the drawings in detail wherein like characters of reference denote corresponding parts, the seat, which is indicated at 10, may be of any suitable construction and is designed to be housed beneath the rear deck of the automobile body with a portion of this deck forming the back 11 of the seat.

Extending along the outer rear edge of the seat is a section 12 which forms a continuation of the back 11 when the seat is closed and thus forms a portion of the rear deck of the vehicle body.

For the purpose of mounting the seat the invention provides a bracket 13 which is vertically disposed and which rises from a right angular base 14 whose arms are secured to the rear cross bar 15 and to one of the side bars 16 of the vehicle frame at the juncture of these bars. The bracket 13 is provided with vertically spaced ears 17 which receive between them a sleeve 18 which is carried at the outer end of an arm 19, the inner end of which is secured to the corner of the seat 10. A hinge pin 20 passes through the sleeve 18 and through the ears 17 and is surrounded by anti-friction bearings 21 and anti-friction bearings 22, the latter providing thrust bearings for the pin. The pin and sleeve are locked together as indicated at 23. The seat will thus be mounted for horizontal swinging movement in such manner as to permit of its being freely and easily movable even when occupied.

In order to relieve the hinge from undue strain, the seat carries at its under side a roller 24 which is movable over an arcuate track 25 arranged within the bottom of the vehicle.

As the portion 12 is rigid with the seat, this portion may be utilized to support a spare tire rack 26, or a trunk carrier. A step 27 is provided for convenience in entering or leaving the seat.

One end of the seat is curved as indicated at 28 and is received within a curved portion 29 within the vehicle body so that the seat will be more firmly held in position when swung inward.

The back 11 carries at each end an arm 30 which is pivotally secured to an arm 31 at each end of the section 12, while a latch 32 is arranged at one end of the seat so as to hold the latter in closed position.

The back 11 is provided with the usual latch or lock 33 so as to hold the back closed.

The invention is susceptible of various changes in its form, proportions and minor details of construction and the right is herein reserved to make such changes as properly fall within the scope of the appended claims.

Having described the invention what is claimed is:—

1. In an automobile, a rumble seat arranged within the rear deck thereof and comprising a seat portion and a sectional back portion having one section rigid with the seat portion and adapted to support a tire carrier or trunk, and the other section relatively movable, means to mount the seat for horizontal swinging movement to project one end of the seat beyond the rear end of the automobile body when the seat is swung outward, and means to prevent outward swinging movement of the seat.

2. In an automobile, a rumble seat arranged within the rear deck thereof, a vertically disposed bracket secured to the frame of the vehicle at one rear corner, said bracket including L-shaped base for attachment to the rear cross member and adjacent portion of the side member of the automobile frame, means to pivotally secure one corner of the seat to the bracket, whereby the seat may be swung outward, and means to hold the seat against outward swinging movement.

3. In an automobile, a rumble seat arranged within the rear deck thereof, means to mount the seat for horizontal swinging movement to project one end of the seat beyond the rear end of the automobile body when the seat is swung outward, means to prevent outward swinging movement of the seat, and a stationary arcuate track carried by the body of the automobile and spaced from the seat mounting means to support the free end of the seat.

In testimony whereof we affix our signatures.

VERLINGTON FARROW HITT.
JOSEPH ORD EVANS.